United States Patent [19]
Gustafson

[11] 3,936,879
[45] Feb. 3, 1976

[54] CARTRIDGE TYPE PLAINT DISC APPARATUS

[75] Inventor: Kenneth Allan Gustafson, Villa Park, Calif.

[73] Assignee: Century Data Systems, Inc., Anaheim, Calif.

[22] Filed: Mar. 16, 1973

[21] Appl. No.: 342,167

[52] U.S. Cl. .................................. 360/99; 360/78
[51] Int. Cl.² ............... G11B 15/16; G11B 21/08
[58] Field of Search 340/174.1 E, 174.1 F, 174.1 C; 179/100.2 D, 100.2 CA, 100.2 P; 360/78, 99, 106

[56] References Cited
UNITED STATES PATENTS

| | | | |
|---|---|---|---|
| 3,485,958 | 12/1969 | Bos et al. | 340/174.1 F |
| 3,668,658 | 6/1972 | Flores et al. | 340/174.1 C |
| 3,678,481 | 8/1972 | Dalziel et al. | 340/174.1 C |
| 3,688,300 | 8/1972 | Whysong et al. | 179/100.2 D |
| 3,721,772 | 3/1973 | Miura et al. | 179/100.2 D |
| 3,731,292 | 1/1973 | Kelley | 340/174.1 E |
| 3,737,883 | 6/1973 | Sordello | 340/174.1 C |
| 3,789,378 | 1/1974 | Bonzano | 360/78 |

*Primary Examiner*—Vincent P. Canney

[57] ABSTRACT

The specification discloses a stepping motor operated cartridge type plaint disc memory utilizing a straddle erase read-write head. Additionally, means are provided for sensing index and sector positions on the disc, as well as the origin and extremities of head travel.

1 Claim, 12 Drawing Figures

WRITE PROTECT

SECIN

CARTRIDGE TYPE PLAINT DISC APPARATUS

BACKGROUND OF THE INVENTION

Most prior art pliant disc systems (known commonly as floppy discs) are limited to read only operations. Such devices employ a mechanical detent system which moves a magnetic head from track to track in accordance with external commands which specify the address of recorded data. These mechanical detent systems are inherently slow, requiring in excess of 333 millisec to effect track to track transitions. What is actually desired is an arrangement for rapidly and accurately positioning a head which is capable of both reading and writing information on a cartridge type floppy dis. In addition, it is desirable that the system include a means for preventing accidental erasure of prerecorded data which is to be retained, as well as means for sensing the origin and extremity positions of head travel, and means for indexing and identifying various sectors of the disc.

Accordingly, a primary object of the present invention is to provide a read-write floppy disc system.

Another object of the present invention is to provide a screw drive stepping motor arrangement for positioning a magnetic head relative to a pliant recording medium.

Another object of the present invention is to provide a straddle erase head to effect high density recording on a pliant disc.

Another object of the present invention is to provide a non-contacting sensing arrangement for determining the various locations of the recording head relative to the recording medium.

Another object of the present invention is to provide a protective interlock to prevent recorded information from being accidentally lost.

Another object of the invention is to provide a means for identifying various sectors of the recording disc.

Other objects and advantages will be obvious from the detailed description of a preferred embodiment given herein below.

SUMMARY OF THE INVENTION

The aforementioned objects are realized by the present invention which comprises a stepping motor having a Helix drive armature for incrementally positioning a carriage so as to correspond with the location of recording tracks on a pliant disk. The carriage supports a straddle erase read-write head which is operative connected to the read-record electronics. Several special sensors are provided for (1) indicating limits of carriage travel; (2) the presence of a special write protect hole on the carriage; and (3) to identify index and sector locations on the recording disk.

DETAILED DESCRIPTION OF A PREFERRED EMBODIMENT

Figure 1:
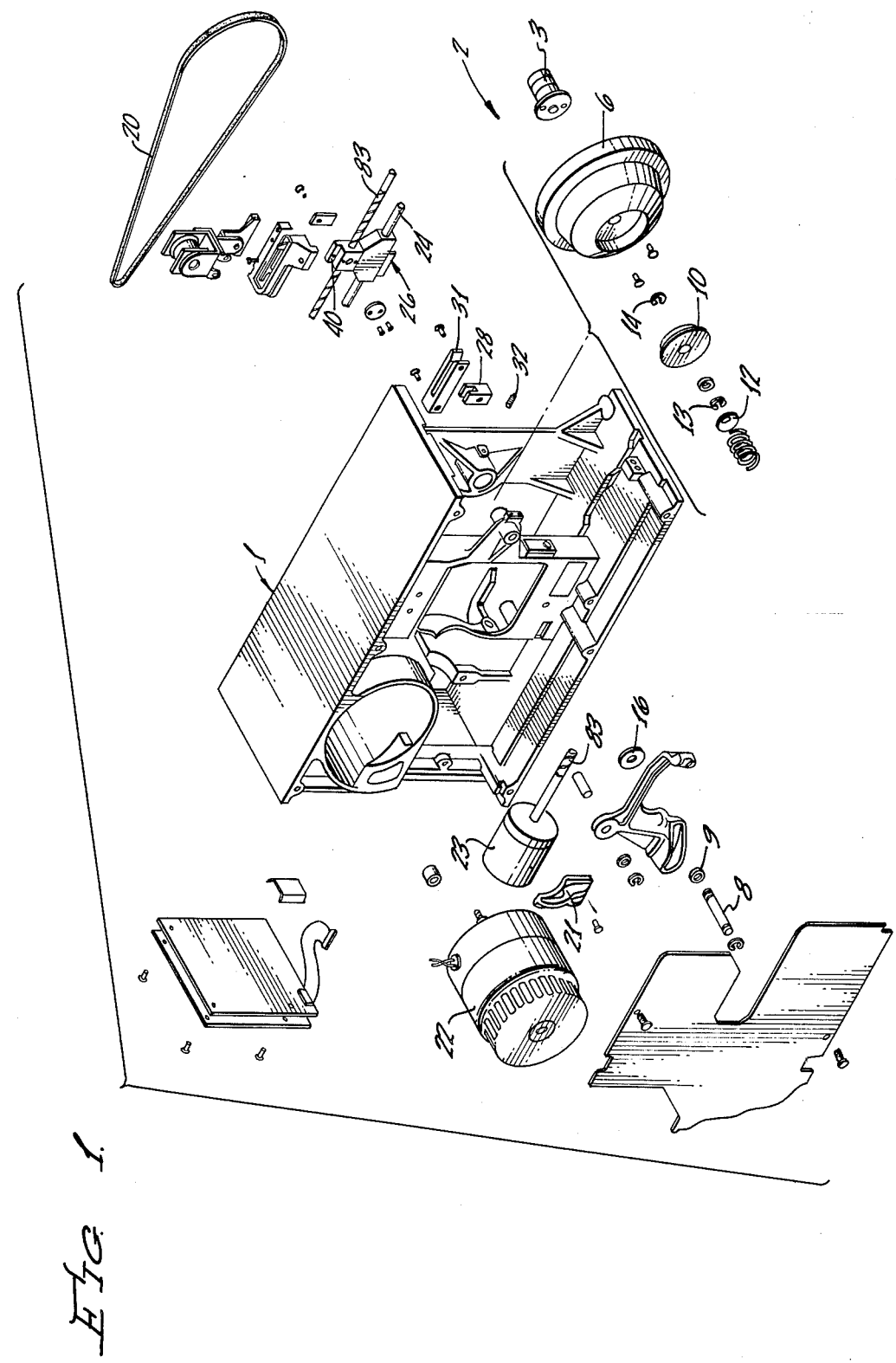
FIG. 1 is an exploded perspective view of a preferred embodiment of the overall floppy disc system.

Adverting to the drawings, and particularly FIG. 1. a preferred embodiment of the present invention comprises a frame 1, and a pliant disk drive assembly which includes spindle hub 3, (which is secured to frame 1 by screw 32), Drive Hub 6, E ring tru-arcs 13 and 14, centering cone 10, washer cup 12, coil spring 15, cam collar 8, thrustwasher 16 and shaft 8. Impeller motor 22 powers the drive assembly 2 via drive belt 20. The drive hub 6 of the drive assembly 2 functions to engage and rotate a pliant disk which is positioned (together with its protective retaining cartridge) between the drive hub 6 and centering cone 10.

Stepping motor 23 is clamped to frame 1 by clamp 21. The extended portion of the armature 83 is cut in the configuration of a helix. Helix 83 and guide shaft 24 (or way) support the carriage 26 which moves from one track position to another in response to rotation of the helix each time stepping motor 23 is energized. The head assembly 40 is mounted to carriage 26 and moves therewith.

The pliant recording disk is divided into a number of separate sectors — each identified by holes. These holes are detected by a photo-electric sensor mounted on tower 31. Tower 28 supports a second photo-electric sensor for detecting the limit of head travel.

Figure 3:
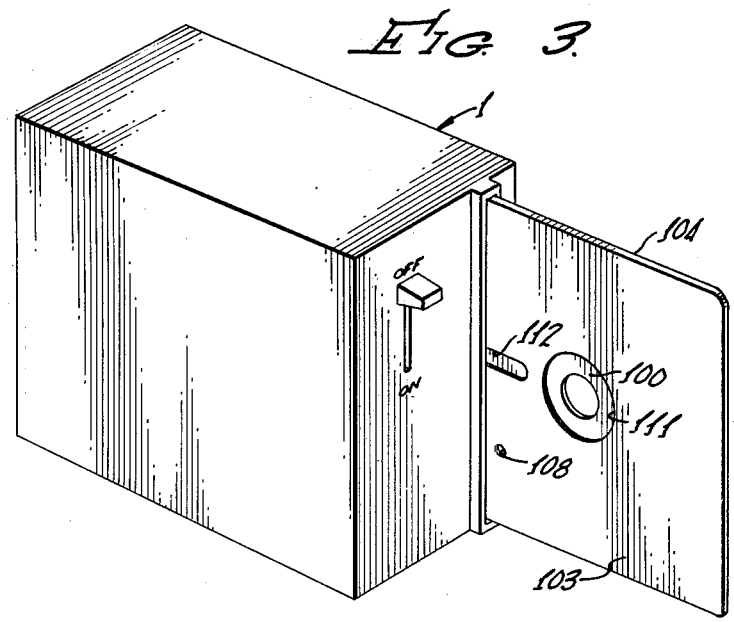
FIG. 3 is a perspective view showing the cartridge as it is loaded.
Figure 5:
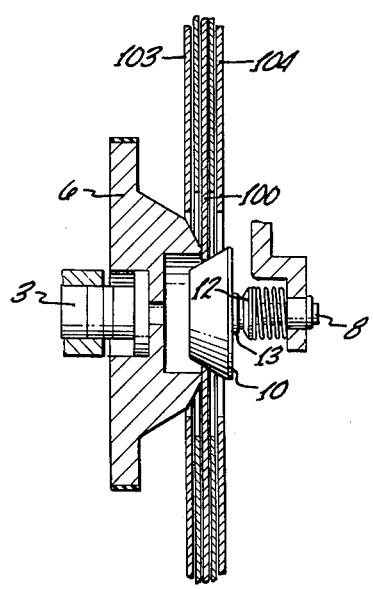
FIG. 5 shows the details of the hub assembly.

In the operating mode, the recording cartridge is positioned between the drive hub 6 and the centering cone 10. FIG. 3 shows the cartridge partially inserted and FIG. 5 shows the relationship of the cartridge to the driving hub after engagement.

Figure 4A:
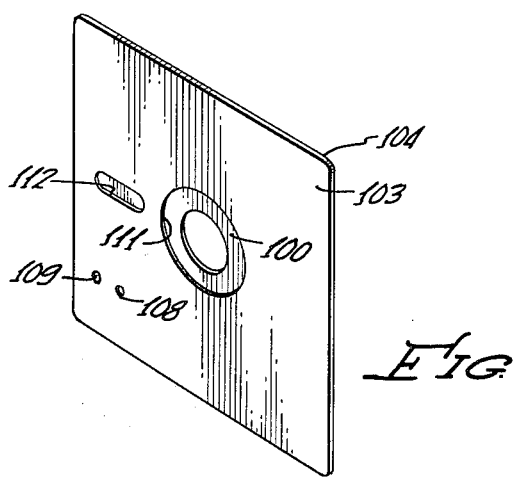
FIG. 4a is a perspective view showing the cartridge.
Figure 4B:
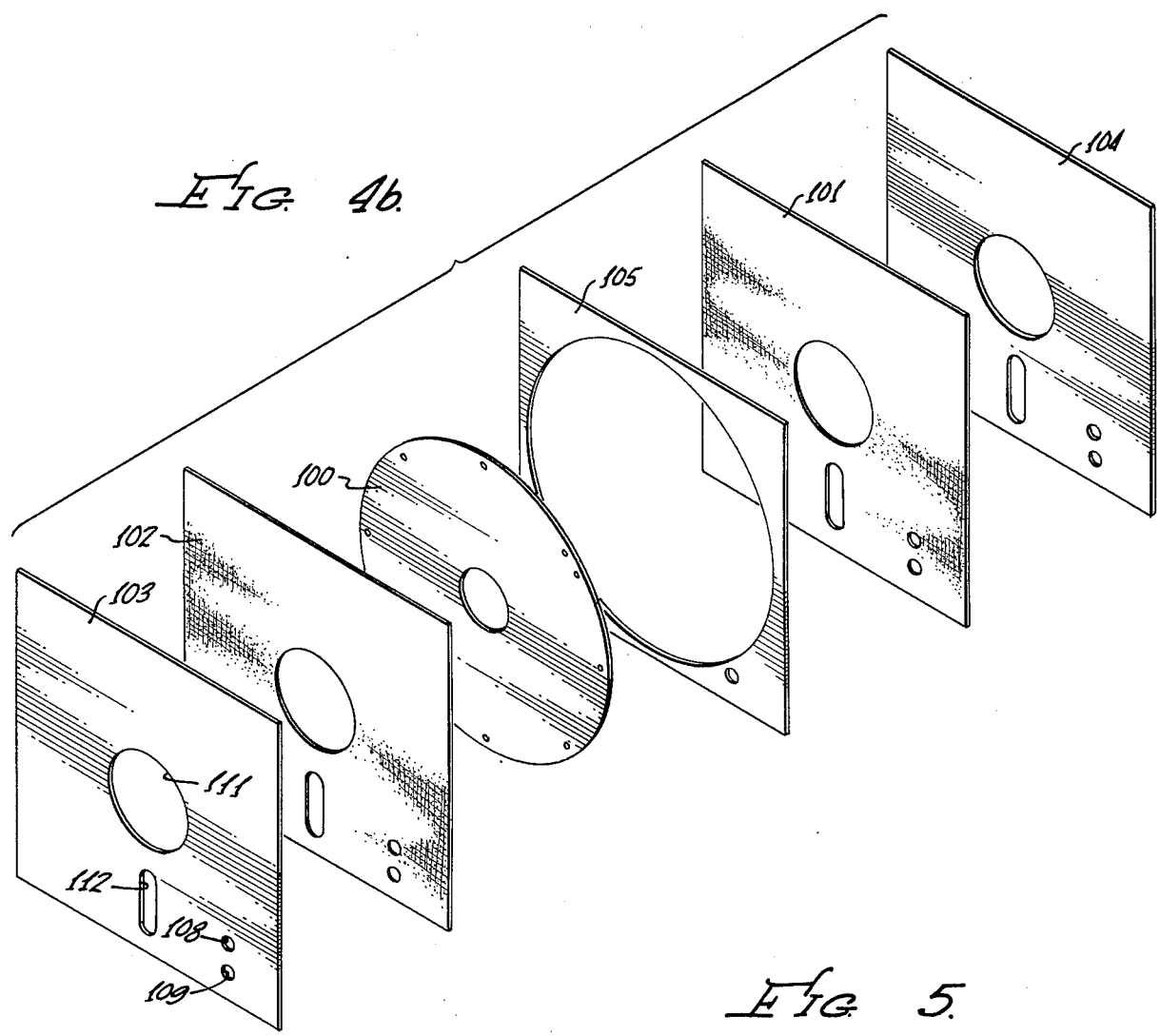
FIG. 4b is an exploded perspective view of the disk and cartridge.

FIGS. 4a and 4b show the details of the cartridge construction. The flexible magnetic recording disk 100 is sandwiched between the liners 101 and 102 and the covers 103 and 104, the spacer 105 having thickness such that the covers 104 and 105 will be parallel. The disk 100 is a flexible 3 mil. mylar 7-⅞ inch diameter oxide coated disk. The complete cartridge (shown in FIG. 4a) is approximately 8 × 8 × 0.055 inches. The disk 100 is exposed through three of the four openings in the cover plate 103. The center circular opening 111 receives the beveled surface of the hub 6, the hub 6 functioning to grip the disk 100 within, causing the latter to rotate when hub 6 is rotated. When the cartridge is loaded, the read/write head assembly 40 will be opposite to the elongated opening 112. This opening exposes a 1½ inch 64 track recording band on the most stable area of the disk. The hole 108 is used to detect the index and sector holes on the disk. Typically the disk will have 8 different sectors (radial locations) each marked by a hole in the disk. There is also one location having two closely spaced holes to identify the start or index position from which the other sector locations are counted. Hole 109 is used to protect against accidentially writing over prerecorded data. This hole is beyond the periphery of the disk 100 and is in direct alignment with a corresponding hole in cover 104. Loading the cartridge with the write protect hole uncovered allows the system to read the disk only. To perform a write operation, the write protect hole must be covered before the cartridge is uncovered. Masking tape or other opaque material can be used to cover the hole.

Figure 2:
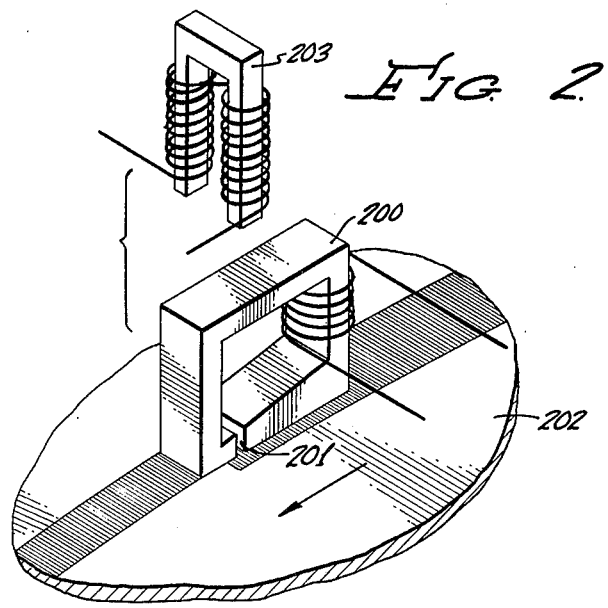
FIG. 2 is an exploded perspective of the read-write straddle erase head.

The read/write head (located on the head assembly 40) is shown in FIg. 2. It includes an electromagnet 200 that can concentrate a high magnetizing flux in the vicinity of the gap 201 which is adjacent to the surface of the recording medium 202. When recording, the flux field is varied to magnetize a track upon the revolving disk in accordance with the desired bit pattern. The head also includes a straddle erase electromagnet 203, the function of which is to erase the edges of the recorded track being written so as to minimize interference and cross-talk between adjacent tracks. The width of the track after parital erasure is 0.010 inches.

Figure 10:
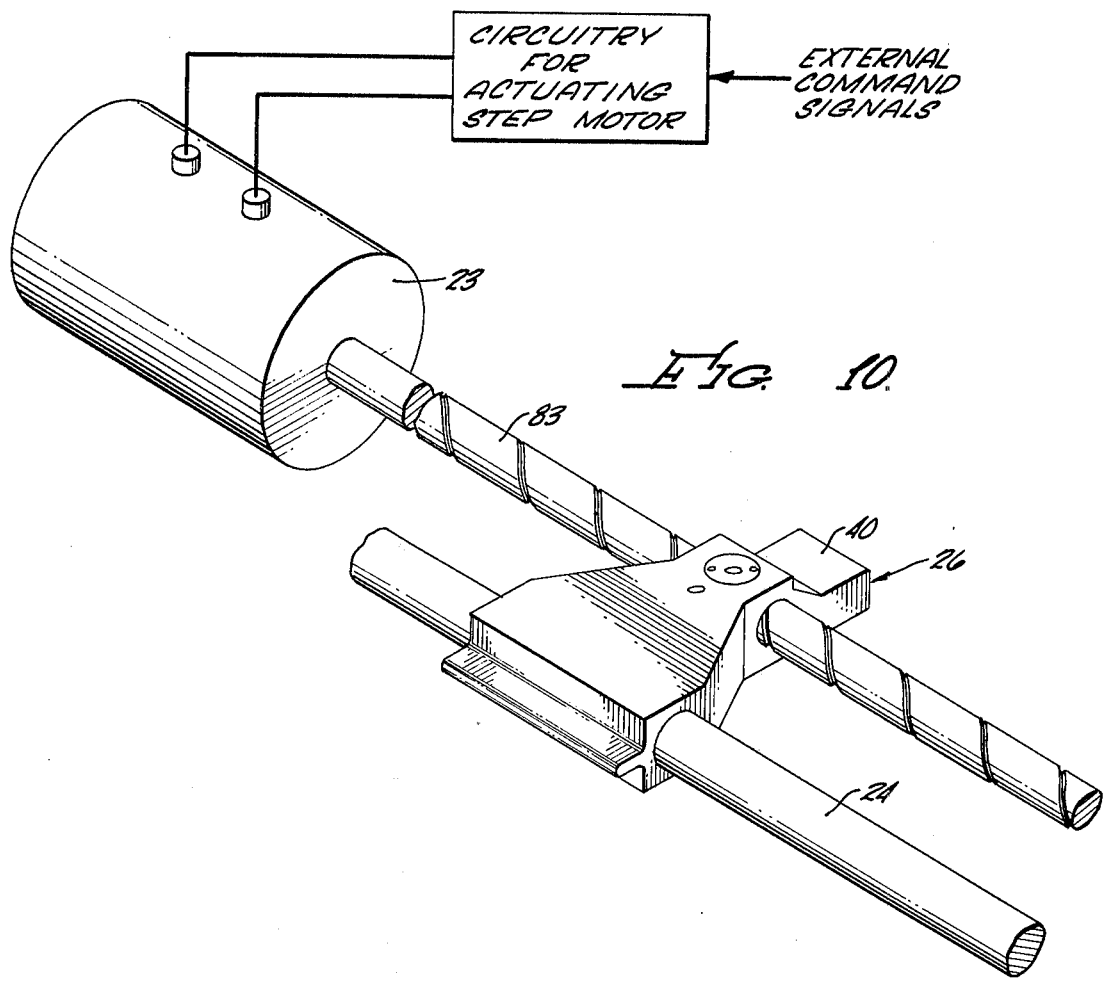
FIG. 10 shows the Carriage, Way and Helix in perspective.
Figure 11:
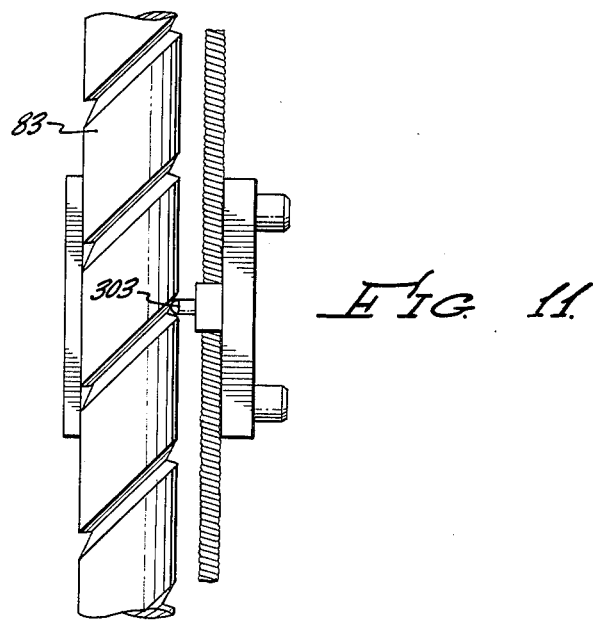
FIG. 11 shows the carriage guide assembly.

The head moves in contact with the disk 100 through the elongated opening 112. Positioning of the head to a particular track is accomplished by electrical pulses applied to the stepping motor 23. Each pulse causes the armature 83 of the step motor to rotate 15 degrees. As shown in FIG. 10 the carriage assembly 26 is supported by the armature 83 and way 24. The carriage 26 is caused to translate to a new track position each time stepper motor 83 is pulsed. This is effected by carriage guide 303 which rides in the groove of the helically cut armature as shown in FIg. 11. Track-to-track positioning may be achieved at a rate of 3 millisec/single step, two steps for a track-to-track position change. As the head is accessing to the desired track, a pad is forced against the disk 100 to flatten the recording area. A second pad is forced against the disk 100 so as to press the disk 100 against the head with a force of approximately 10 grams.

Figure 6:
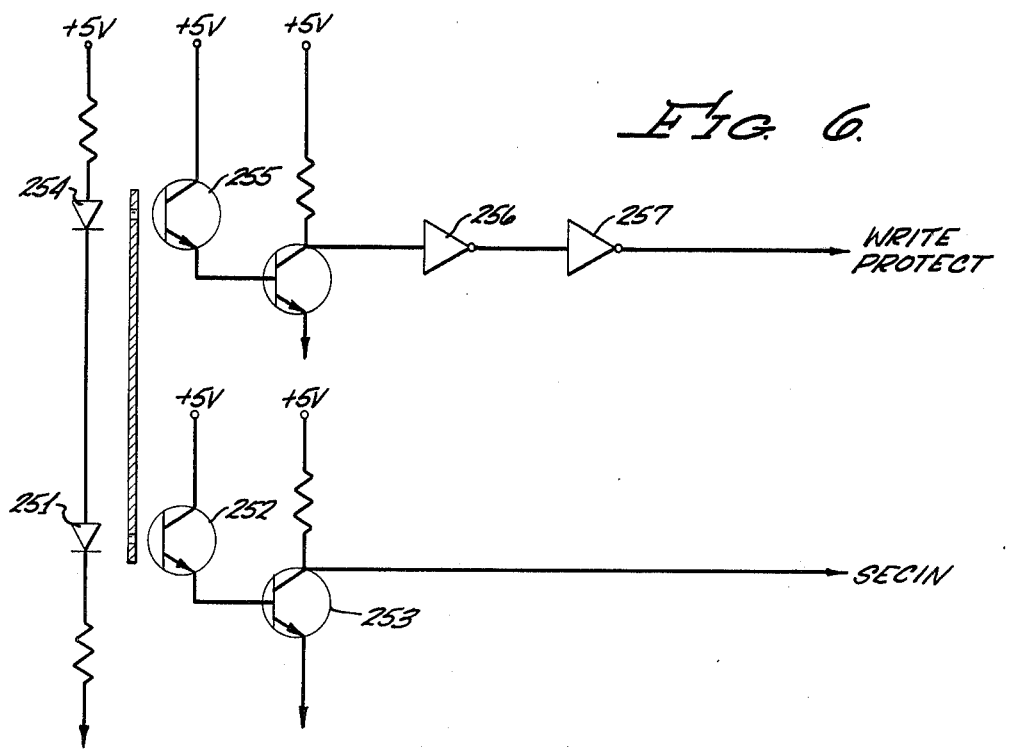
FIG. 6 shows the circuitry for detecting the sector/index and write protect.
Figure 8:
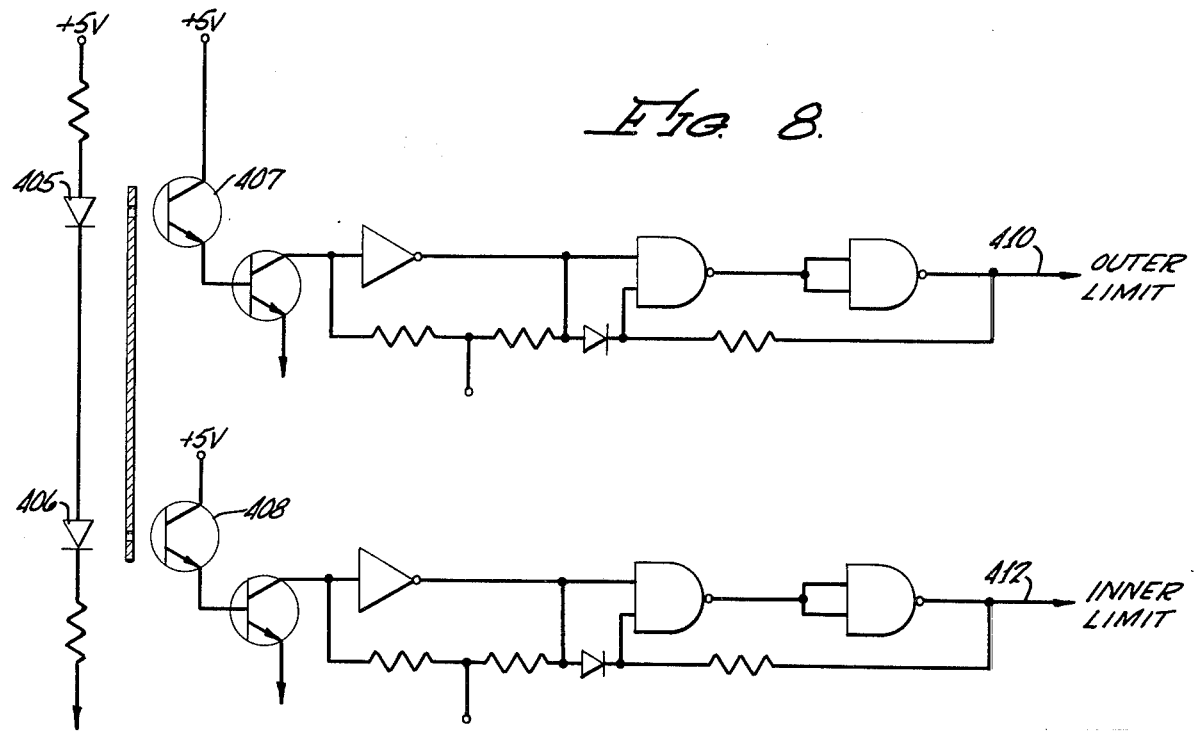
FIG. 8 shows the circuitry for generating the limit signals.
Figure 9:
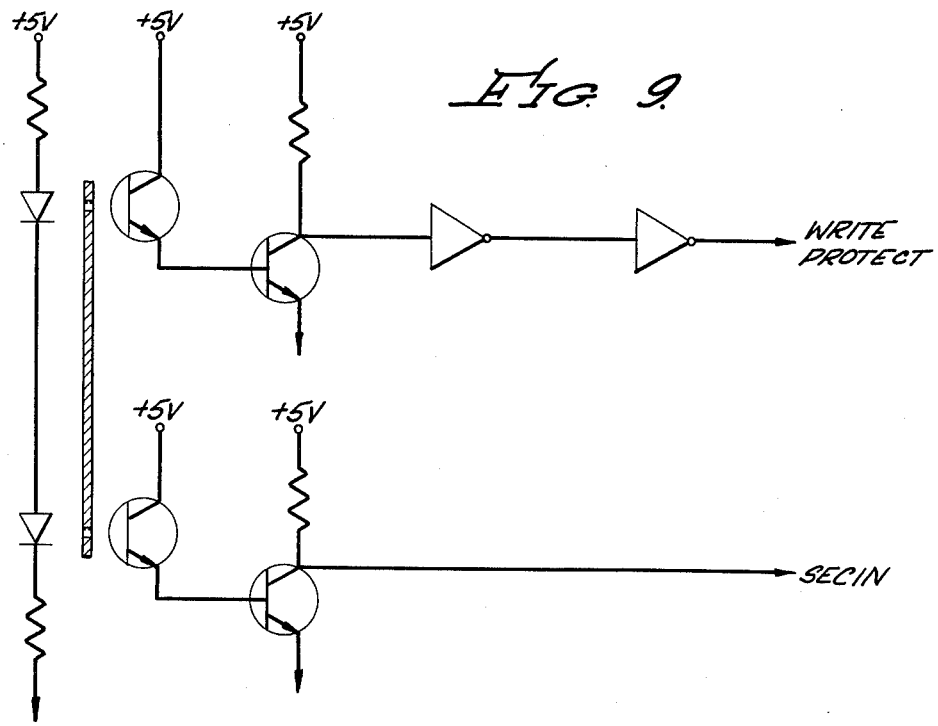
FIG. 9 shows the circuitry for detecting the sector/index and write protect.

FIG. 6 shows the circuitry for detecting sector/index and write protect. FIG. 8 shows the circuitry for detecting the limits of head travel. In all four cases light emitting diodes are positioned to actuate a corresponding phototransistor whenever the optical path therebetween is unobstructed. For example, LED 251 is mounted adjacent to hole 108 on one side of the inserted cartridges and phototransistor 252 ia mounted adjacent to hole 108 on the opposite side of the cartridge on sector tower 31. Whenever an index or sector hole in the rotating disk is coincident with hole 1081, light impinges on the base of phototransistor 252 causing it to conduct. The output is amplified by transistor 253 to provide a pulse. Diode 254 and transistor 255 function in a like manner to detect whether the write protect hole has been covered. Amplifier 256 and 257 function to provide a steady d.c. output if the write protect hole is uncovered.

Figure 7:
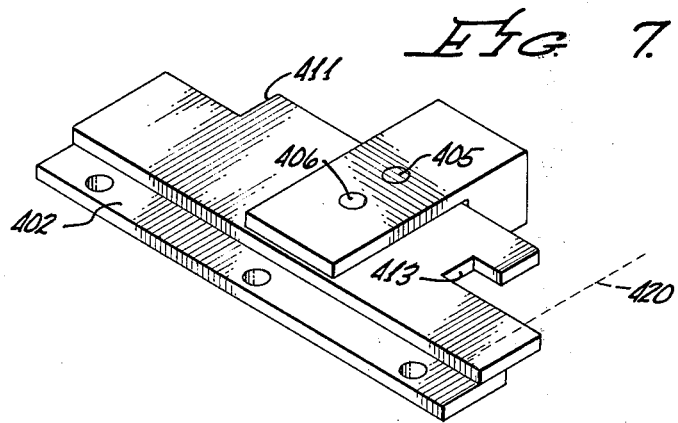
FIG. 7 shows the head position detector.

FIGS. 7 and 8 explain the head position limit arrangement. Slide 402 is attached to and moves with the read/write head assembly 40. It passes through the detection arrangement [i.e., between light emitting diodes (405 and 406) and their corresponding phototransistors (407 and 408) mounted on limit tower 28]. The position of the carriage is detected according to which transistor (407 or 408 is conducting. For example, if neither 407 or 408 are "on", the carriage will be somewhere between the limits. If only 407 is conducting, an outer limit signal will be generated on line 410 as a consequence of cutaway area 411. This indicates that the carriage is beyond the last recorded track (in the present design this corresponds to track No. 63). If only 408 is conducting, a signal will appear on 412 indicating that the carriage is positioned at track "00" — this signal being generated as a consequence of cutaway area 413. If both 407 and 408 are caused to conduct, the carriage position will be below track "00" as indicated by dotted line 420.

Although the basic concept of the invention have been shown and described in connection with a particular apparatus, it will be understood that the invention is not limited thereto, and that numerous changes, modifications and substitutions may be made without departing from the spirit of the invention.

I claim:

1. In a pliant disk recording system of the type utilizing a rigid cartridge for retaining the disk, the improvement which comprises:

a stepping motor having helically cut armature extension;

a carriage adapted to translate in accordance with the rotation of said helically cut armature;

a read/write straddle erase head attached to said carriage adjacent to the recording surface of said pliant disk;

means for actuating said stepping motor in accordance with external commands whereby said head may be incrementally moved from one track position to another;

means for detecting the limit positions of carriage travel, said means comprising:

a tower having a photoelectric sensor, said tower to be positioned adjacent to location at the end of carriage travel whereby the presence of the carriage will interrupt light impinging on said photoelectric sensor.

* * * * *